(12) United States Patent
Quaegebeur et al.

(10) Patent No.: US 11,209,403 B2
(45) Date of Patent: Dec. 28, 2021

(54) IN-LINE, CONTACTLESS AND NON-DESTRUCTIVE METHOD AND SYSTEM FOR DETECTING DEFECTS IN A MOVING CARDBOARD STRUCTURE

(71) Applicant: ABZAC CANADA INC., Drummondville (CA)

(72) Inventors: Nicolas Quaegebeur, Waterville (CA); Patrice Masson, Sherbrooke (CA); Alain Berry, Sherbrooke (CA); Cédric Ardin, Mont-Royal (CA); Pierre-Michel D'Anglade, Montreal (CA)

(73) Assignee: ABZAC CANADA INC., Drummondville (CA)

( * ) Notice: Subject to any disclaimer, the term of this patent is extended or adjusted under 35 U.S.C. 154(b) by 124 days.

(21) Appl. No.: 16/477,392

(22) PCT Filed: Mar. 1, 2018

(86) PCT No.: PCT/CA2018/050240
§ 371 (c)(1),
(2) Date: Jul. 11, 2019

(87) PCT Pub. No.: WO2018/157250
PCT Pub. Date: Sep. 7, 2018

(65) Prior Publication Data
US 2020/0025720 A1  Jan. 23, 2020

Related U.S. Application Data

(60) Provisional application No. 62/465,968, filed on Mar. 2, 2017.

(51) Int. Cl.
*G01N 29/12* (2006.01)
*G01N 29/34* (2006.01)

(52) U.S. Cl.
CPC ........... *G01N 29/348* (2013.01); *G01N 29/12* (2013.01); *G01N 2291/0231* (2013.01)

(58) Field of Classification Search
CPC ........ G01N 29/12; G01N 29/46; G01N 29/27; G01N 29/348; G01N 2291/0231;
(Continued)

(56) References Cited

U.S. PATENT DOCUMENTS 4,556,922 A * 12/1985 Erhart ................ G11B 15/6656
360/85
4,645,553 A    2/1987 Languillat
(Continued)

FOREIGN PATENT DOCUMENTS

WO    9117435 A1    11/1991
WO    2007033410 A1    3/2007
(Continued)

OTHER PUBLICATIONS

Quaegebeur et al., "Ultrasonic non-destructive testing of cardboard tubes using air-coupled transducers" NDT and E International, vol. 93, XP085265789, 2018, pp. 18-23.
(Continued)

*Primary Examiner* — Jacques M Saint Surin
(74) *Attorney, Agent, or Firm* — BakerHostetler

(57) ABSTRACT

An in-line, contactless and non-destructive method for detecting and identifying defects in a moving cardboard structure is provided, as well as the associated system. The cardboard structure is of the type made of layered paper plies, such as cardboard tubes for example. The method includes the steps of emitting acoustic waves with predetermined frequencies toward the moving cardboard structure. The acoustic waves are converted into mechanical waves propagating through the moving cardboard structure. The method also includes a step of capturing the acoustic
(Continued)

waves propagated, wherein said captured acoustic waves result from a conversion of the propagated mechanical waves through the moving cardboard structure. The method also provides steps of analyzing the captured acoustic waves; and detecting and identifying defects in the moving laminated cardboard structure based on predetermined propagation properties measured from the captured acoustic waves.

37 Claims, 13 Drawing Sheets

(58) Field of Classification Search
CPC ..... G01N 2291/0237; G01N 2291/011; G01N 2291/0421; G01N 2291/015; G01N 2291/0426
USPC .......................................................... 73/594
See application file for complete search history.

(56) References Cited

U.S. PATENT DOCUMENTS

| | | | |
|---|---|---|---|
| 5,824,908 A | 10/1998 | Schindel et al. | |
| 5,873,806 A | 2/1999 | Biagiotti | |
| 6,115,127 A | 9/2000 | Brodeur et al. | |
| 6,543,288 B1 | 4/2003 | Blouin et al. | |
| 7,921,892 B2 | 4/2011 | Baierl et al. | |
| 8,156,808 B2 | 4/2012 | Itsumi et al. | |
| 8,156,817 B2 * | 4/2012 | Kaneko | G01L 9/007 73/728 |
| 9,435,980 B2 * | 9/2016 | Lippert | G03F 7/7015 |
| 10,823,708 B2 * | 11/2020 | Brelati | G01N 29/07 |
| 2006/0048578 A1 | 3/2006 | Dickinson et al. | |
| 2015/0224733 A1 | 8/2015 | Hagler et al. | |
| 2016/0009516 A1 * | 1/2016 | Mark | B41J 3/407 493/13 |
| 2019/0120779 A1 * | 4/2019 | Vonderheiden | G01N 33/346 |
| 2020/0118262 A1 * | 4/2020 | Takemoto | G01B 11/02 |

FOREIGN PATENT DOCUMENTS

| | | | | |
|---|---|---|---|---|
| WO | WO2007073340 | * | 6/2007 | ............ G01N 33/34 |
| WO | WO2009057608 | * | 5/2009 | ............... B31F 1/28 |
| WO | WO2012069722 | * | 5/2012 | ............. G06F 3/043 |
| WO | WO2013023987 | * | 2/2013 | ............ G01N 33/46 |
| WO | WO2020141479 | * | 7/2020 | ............ G01N 29/06 |

OTHER PUBLICATIONS

International search report, PCT/CA2018/050240, dated Mar. 1, 2018.
CCTI Standard Testing Procedure T-150, Composite Tubes and Cores, pp. 1-8., Sep. 2002.

* cited by examiner

IN-LINE, CONTACTLESS AND NON-DESTRUCTIVE METHOD AND SYSTEM FOR DETECTING DEFECTS IN A MOVING CARDBOARD STRUCTURE

CROSS-REFERENCE TO RELATED APPLICATIONS

The present application is a U.S. National Stage of International Patent Application No. PCT/CA2018/050240, filed Mar. 1, 2018, which claims priority to U.S. Provisional Patent Application No. 62/465,968, filed on Mar. 2, 2017, the disclosures of which are hereby incorporated by reference in their entirety.

TECHNICAL FIELD

The technical field generally relates to quality control in the manufacturing of cardboard laminates. More particularly, it relates to systems and methods for evaluating the quality of cardboard laminates in a non-destructive manner.

BACKGROUND

During the manufacture of articles, it is important to be able to reliably evaluate the articles to determine whether they meet required specifications. As can be appreciated, defects introduced during the manufacturing process can have a significant impact on the article's performance.

In the context of manufacturing articles made from cardboard laminates, for example such as tubes made from wound bands—or plies—of laminated cardboard, for which the bands or plies can be wound with angles varying between 1 to 90 degrees relative to the longitudinal axis of the tubes, there are several parameters which can impact the strength of the tube. In the context of manufacturing laminated cardboard tubes, such defects can affect the radial compression strength of the tube, i.e. its ability to withstand compression exerted radially on the tube, for example while supporting a roll of plastic film which contracts as it cools down.

The most common way of evaluating the radial compression strength of a cardboard tube is by subjecting it to a "crush" test. This type of test involves applying radial forces to sample tubes until they fail structurally. While this method can provide accurate indications of the structural strength of the tubes, it disadvantageously requires that the tube be destroyed in the process. Therefore, it would be impossible to apply such a test to all tubes manufactured during a production run.

There is therefore a need for a quality control method which alleviates at least some of the shortcomings of existing destructive and random-based tests.

SUMMARY

According to a general aspect, an in-line, contactless and non-destructive method is provided, for detecting and identifying defects in a moving cardboard structure made of layered paper plies. The method comprises the steps of emitting acoustic waves toward the moving cardboard structure at a first location. The acoustic waves are converted into mechanical waves, propagating through the moving cardboard structure. The acoustic waves are emitted with predetermined frequencies in the airspace surrounding the moving cardboard structure. The method also comprises a step of capturing the acoustic waves propagated in the airspace at a second location, spaced away from the first location, where the captured acoustic waves result from a conversion of the propagated mechanical waves through the moving cardboard structure. The captured acoustic waves are then analyzed, and with this analysis, defects in the moving laminated cardboard structure are detected and identified, based on predetermined propagation properties of the measured captured acoustic waves.

According to a possible embodiment of the method, the moving laminated cardboard structure is a cardboard tube in which the layered paper plies are spirally wound. The method can be applied tubes for which the plies are wound at angle or perpendicularly relative to the central axis of the tubes. The method preferably comprises steps of measuring the frequency response of the captured acoustic waves and of comparing said measured frequency response to a plurality of reference frequency responses representative of undamaged moving laminated cardboard structures.

According to yet another aspect, a system for detecting and identifying defects in the moving cardboard structure made is also provided. The system comprises a signal generator coupled to an acoustic emitter probe. The emitter probe is positioned at a first location, at a predetermined distance from the moving cardboard structure. The emitter probe is operable to emit the acoustic waves at predetermined frequencies toward the moving cardboard structure. The system also includes a receiver probe positioned at a second position, at a predetermined distance from the moving cardboard structure and spaced away from the first location. The receiver probe is operable to capture the acoustic waves dispersed in the air space, resulting from the conversion of the propagated mechanical waves through the moving cardboard structure. The system also comprises a processing device operatively connected to the receiver probe, the processing device being configured to analyze propagation properties of the captured acoustic waves captured by the receiver probe, and is programmed to detect and identify defects in the moving laminated cardboard structure based on predetermined properties measured in the captured acoustic waves.

Other features and advantages of the present invention will be better understood upon reading of preferred implementations thereof, with reference to the appended drawings.

BRIEF DESCRIPTION OF THE DRAWINGS

It is noted that the appended drawings illustrate only exemplary embodiments of the invention and are, therefore, not to be considered limiting of the scope of the invention as defined by the appended claims for the invention may admit to other equally effective embodiments.

DETAILED DESCRIPTION

In the following description, the same numerical references refer to similar elements. Furthermore, for the sake of simplicity and clarity, namely to not unduly burden the figures with several references numbers, not all figures contain references to all the components and features of the present invention and references to some components and features may be found in only one figure, and components and features of the present invention illustrated in other figures can be easily inferred therefrom. The embodiments, geometrical configurations, materials mentioned and/or dimensions shown in the figures are preferred, for exemplification purposes only.

Figure 1:
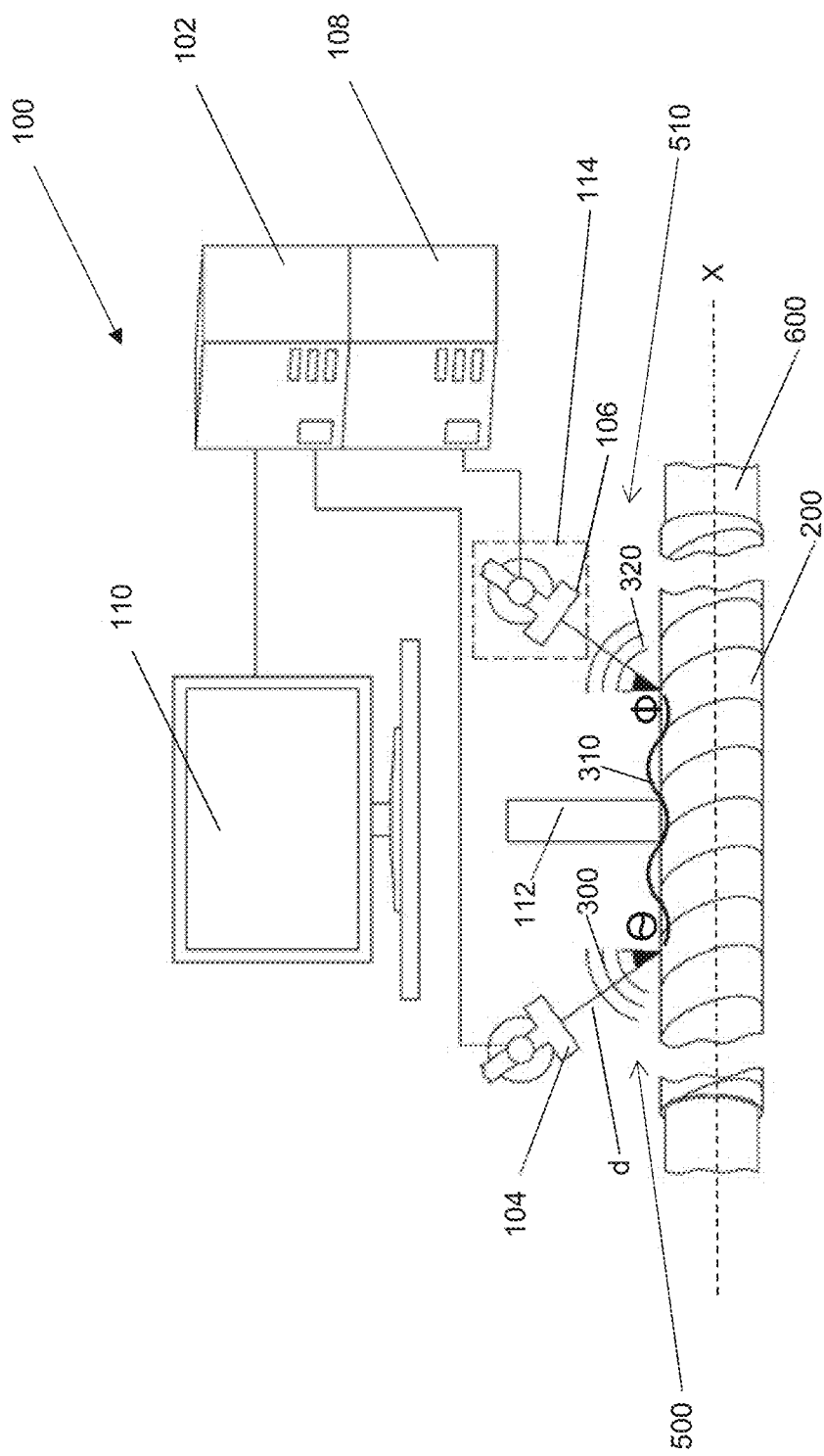
FIG. 1 is a schematic illustrating a system for detecting and identifying defects in a moving cardboard structure, according to a possible embodiment of the invention.

With reference to FIG. 1, an exemplary in-line, contactless and non-destructive system 100 for detecting and identifying defects in a moving cardboard structure 200 is shown. The system can also be referred to as an "in-line quality control system". By "in-line", it is meant that the system can be used or integrated in a manufacturing line, with no or limited interference or interruption of the manufacturing process.

The moving cardboard structure 200 that can be assessed with the present system is of the type made of layered paper plies, also referred to as paper bands. The present system is particularly well adapted for verifying the quality of cardboard tubes during their manufacturing, but can be used for other cardboard structures. In the case of cardboard tubes, the layered paper plies are typically spirally wound, and are connected/attached to one another with organic and inorganic solvent based adhesives.

There are several parameters that can impact the strength of cardboard structures. In the case of cardboard tubes, resistance to axial compression is an important factor, as the tubes are typically used for supporting several layers of web material rolled thereon, such as plastic films for example. Some of the parameters that can impact the resistance of laminated cardboard structures include: the thickness of the cardboard plies, the thickness of the walls of the cardboard structure, the ply width, the laminated surface percentage, the percentage or ratio of humidity in the cardboard walls, the overlap or spacing between adjacent plies, etc. As can be appreciated, these parameters can be impacted by defects during the manufacturing process, such as gluing defects, varying material thickness and size, uncontrolled humidity, etc. The present system, as illustrated in FIG. 1, and its associated method, aims to detect and identify defects in the cardboard structure. Defect detection and identification during the in-line manufacturing process provides the necessary information for operators to correct/address the situation right away, without having to sacrifice entire production batches, as is the case with existing testing methods, such as "crush" testing for example.

As mentioned previously, other moving cardboard structures, such as cornerboards, and angleboards, and other similar products, that are manufactured in a semi-continuous or continuous/endless process, can be inspected with the present system. By a "moving" cardboard structure, it is meant that the structure is displaced or moved while the quality control inspection (i.e. the defect monitoring/identification) occurs. In the case of tubes or cornerboards, the cardboard structures have a lengthwise axis, and are translated along this lengthwise axis. For tubes specifically, which have a central axis, the tubes may also be translated and/or rotated along said central axis.

Broadly described, the method conducted with the system 100 of FIG. 1, consists of emitting acoustic waves 300 in the airspace toward the moving cardboard structure 200. The acoustic waves 300 are emitted by a first probe located at a first location/position 400, and, upon hitting the moving cardboard structure 200, are converted into mechanical waves 310 that propagate through the moving cardboard structure. The mechanical waves 310 will eventually be dispersed back in the air as acoustic waves 320, and are captured by a second probe, located at a second location/position 410, spaced away from the first location. The captured acoustic waves 320 result from a conversion of the propagated mechanical waves 310 through the moving cardboard structure 200. The captured acoustic waves 320 are then analysed, and defects are detected and identified based on propagation properties measured from the captured acoustic waves.

The acoustic waves 300 emitted by the first probe can be, for example, sound pressure waves having predetermined frequencies and/or amplitudes. In the illustrated embodiment, the cardboard structure 200 under inspection is a cardboard tube being manufactured, where paper plies have been spirally wound over a mandrel and wetted with glue, the "endless" cardboard tube being moved toward a cutting saw, to cut the cardboard structure into tubes of pre-set length. The tubes may be dried prior to and/or after being cut.

Still referring to FIG. 1, the acoustic waves 300 are generated by a signal generator 102 coupled to the first probe, which is an acoustic emitter probe 104. The emitter probe is positioned at the first location, at a predetermined distance d from the moving cardboard structure. The emitter probe 104 is operable to emit acoustic waves 300 at predetermined frequencies and/or amplitudes. The "behavior" of the moving cardboard structure is measured by the second probe, which is a receiver probe 106. The receiver probe 106 is positioned at the second position 410, at a predetermined distance d' from the moving cardboard structure 200 and spaced away from the first location 400. The distance between the probes and the cardboard structure can be set between 0 and 30 cm, and is preferably no more than 20 cm. The distance between the two probes can also be set between 5 to 100 cm, and preferably between 20 and 40 cm. The receiver probe 106 is operable to capture the acoustic waves 320 dispersed in the air space after their passage in the cardboard structure. The captured acoustic waves 320 result from a conversion of the propagated mechanical waves 310 through the moving cardboard structure 200.

The probes 104, 106 (also referred to as "transducers") are spaced-apart from the body of the cardboard structure, such that there is an airspace 500, 510 between the structure 200 and each probe 104, 106. In this fashion, the quality control can be said to be "non-contact", in that the generating and/or measuring instruments (i.e. the probes) are not physically in contact with the structure being inspected. In other words, the probes or transducers used in the present embodiment are air-coupled. More specifically, in the present embodiment, the transducers 104, 106 are capacitive transducers. It is appreciated, however, that other types of probes can be used, such as a loudspeaker, piezoceramics transducer and/or microphones.

The first probe 104 is an emitter (or an actuator) in that it is configured to emit an acoustic wave at specific frequencies, and preferably in a specific direction. The signal generator 102 and the emitter probe 104 generate the emitted acoustic waves at frequencies below 100 kHz, and preferably between 10-50 kHz, and still preferably between 30-50 kHz. The signal generator 102 can vary different characteristics of the acoustic waves, including the frequency, the amplitude, the phase and/or the velocity.

The second probe 106 is a receiver probe (or a sensor/detector) in that it is configured to capture acoustic waves 320 coming from a specific direction such as those emanating from the structure 200. For example, the receiver can comprise a microphone for measuring sound waves emanating from the tube 200 and received at an input end of the probe 106.

In the illustrated configuration, the structure 200 has a substantially elongated body that is translated and rotated along its central axis over a rotating mandrel. The mechanical wave 310, transmitted through the tube over a given length L, is measured by the receiver probe 106, and the transmission properties of the wave are analyzed by a processing device 110, to determine whether there are defects in the tube 200. The processing device 110 may include a signal analyzer, and a computer with memory and processor(s), programmed to detect specific propagation properties or characteristics, in the captured acoustic waves 320. In the embodiment illustrated at FIG. 1, the emitter probe 104, and the acoustic waves are directed at angle $\ominus$ toward the moving cardboard structure, relative to the lengthwise axis of the cardboard structure, and the acoustic waves dispersed by the moving cardboard structure 200 are captured at substantially the same angle $\phi$. However, depending on the type of defects to identify, different angles, $\ominus$ and $\phi$ can be selected for the emitter and/or the receiver probes 104, 106.

It is further appreciated that the probes 104, 106 can be positioned differently depending on the type of analysis that is being performed, including the frequency and/or amplitude of the acoustic wave used, and the specific propagation parameters which are to be analyzed. In some embodiments, the probes can be repositioned to perform different types of inspections on the same cardboard structure. It is also possible to include more than one emitting probe, and/or more than one receiving/capturing probe.

According to one possible embodiment, both probes 104, 106 are positioned on a same side of the cardboard structure 200, and are separated by an acoustic insulator 112 to block a direct path for acoustic waves travelling between the probes 104, 106, exterior to the structure 200. In the present case, the acoustic insulator 112 comprises a foam block positioned in the airspace between the probes 104, 106, and also on the top side of the structure 200 and adjacent to its exterior walls, thus blocking a direct path for acoustic waves through the air between the probes. In this fashion, the waves measured by receiver 106 will most substantially correspond to the waves having travelled through the tube, and not those arriving directly from the emitter probe/transmitter 104 through the air.

In some embodiments, the probes 104, 106 can be positioned on opposite sides of the structure and/or one or both probes can be positioned adjacent to interior walls of the tube. Moreover, additional or alternative insulating means can be provided. For example, in some embodiments the insulating means can extend along the sides and below the bottom of the tube, and/or insulating means can be provided in the hollow interior of the tube. Insulating means can be further provided on any structural equipment supporting the probes and/or tube, thus dampening any sound waves travelling through the supporting structure, and isolating the waves arriving at the receiver to correspond as much as possible to those having travelled through the body of the tube/cardboard structure. The acoustic insulator can be provided as part of a casing, provided around the receiver probe 106, to better isolate the receiver probe from the emitter probe, and also from ambient noise.

In preferred embodiments, a rotating mandrel, or rollers, and/or other rotation or displacement mechanisms 600 are provided to displace the cardboard structure laterally relative to the probes 104, 106 (i.e. in a direction parallel to its length, or in a direction parallel to the axis around which the tube is rotated). In this fashion, the probes 104, 106 can be aligned with a different segment of the structure 200, so that the entire surface is subjected to the acoustic waves of the emitter probe. The cardboard structure is thus continuously inspected during production, and is inspected down-line from where the plies are wound and bonded, before the tube 200 is cut to size, and before the cardboard structure is cured.

As mentioned previously, the emitter and receive probes 104, 106 are respectively oriented at angles $\ominus$ and $\phi$ relative to the vertical (i.e. relative to an axis perpendicular to lengthwise axis X), for example at an angle between 0 and 90°, or at an oblique angle. Preferably, the angle is selected to assure an adequate coupling between the mechanical wave 310 propagated in the tube 200 and the acoustic waves 300, 320 in the air, thereby assuring that the acoustic waves transmit well between the structure 200 and probes 104, 106. As can be appreciated, the selected angles can vary depending on the properties of the cardboard structure, the frequency of the acoustic waves, and the desired vibration modes of the cardboard structure. The optimal angle can be determined using simulations of the cardboard structure, to determine the distance/orientation that provides the best frequency response (such as the highest Signal-to-Noise ratio) at the receiver probe. Preferably, the emitter probe 104 is configured to induce propagative flexural waves in the tube rather than longitudinal or torsional waves. In this fashion, the waves can rotate around the tube as it propagates while bending/twisting the cardboard structure. The receiver probe 106 is preferably configured to detect the flexural modes induced in the cardboard structure 200 by the emitter probe 104. According to the properties of the cardboard structure 200, the emitter and receiver probes 104, 106 can be angled between approximately 30° and 60°, and in some embodiment between 35 and 45°. Depending on the properties of the emitted acoustic waves, the mechanical waves propagating through the cardboard structures can be flexural waves generated at a plurality of different frequencies. The captured acoustic waves are thus measured at each of these different frequencies.

Preferably, probes 104, 106 are positioned such that they partially face one another, i.e. both probes 104, 106 face the section of the cardboard structure under inspection (in this example the cardboard tube) and preferably still, angles $\Theta$ and $\phi$ are congruent. Yet angles $\Theta$ and $\phi$ can be adjusted depending on the frequency of the input acoustic waves, the thickness of the walls of the tube, and/or the desired guided wave mode. Moreover, in some embodiments, angles $\Theta$ and $\phi$ can be different from one another, and/or probes 104, 106 can face different directions, for example in configurations where the emitter probe 104 is configured to induce one guided wave mode in the cardboard structure 200, and the receiver probe 106 is configured to detect a different mode.

In the illustrated system 100, the signal generator 102 is coupled to the emitter probe 104, and a signal processor 108 is also coupled to the receiver probe 106. In operation, the probes 104, 106 operate in a pitch-and-catch configuration. The signal generator 102 drives the emitter probe 104 to emit acoustic waves 300 at a desired frequency and amplitude. Preferably, the acoustic waves are emitted at different frequencies in bursts, i.e. in the form of packets of waves, such as a burst signal, including several cycles of a sinusoid, filtered by a Hanning window or other similar function.

Preferably, the signal generator 102 is configured to generate frequencies in a range of 0 kHz to 100 kHz. Preferably still, the signal generator 102 comprises an amplifier to generate signals with amplitudes of a predetermined maximum voltage, such as a peak voltage between 50 to 150 Vpk, and preferably on the order of 100 Vpk. The generated acoustic wave 300 passes through the moving cardboard structure 200, causing the structure to vibrate and deform slightly as the wave passes. The vibrations in the moving cardboard structure 200 are guided mechanical waves 310, which are emitted back in the airspace surrounding the structure as acoustic waves 320, as they exit the cardboard structure 200. These acoustic waves 320 resulting from the passage of the mechanical waves in the cardboard structure are detected by the receiver probe 106 and analyzed by the signal processing device 108. The signal processing device 108 typically comprises a processor and memory. For example, the memory may store reference frequency responses representative of undamaged moving laminated cardboard structures, and also preferably stores instructions executable by the processor to measure the frequency response of the captured acoustic waves. The signal processing device 108 compares the measured frequency response to the reference frequency response representative of the undamaged moving laminated cardboard structures and identify defects when the frequency response of the captured acoustic wave is above a given frequency threshold.

The memory may also store different frequency band thresholds for different types of defects, including for example the presence of a splice in one of the paper plies, a reduction of the width of one or more of the paper plies, a decrease in wall thickness and an increase in moisture content. Typically, the signal processing device will include a high impedance sampling card to capture the resulting signal (i.e. frequency response) for display and digital analysis. An instrument interface may be used for calculating, averaging and displaying the frequency responses measured from the captured acoustic waves.

Once the frequency response is obtained, transient analysis in sub-bands can be carried out in real time or post processing. As can be appreciated, the transient analysis can quantify certain propagation properties of the captured acoustic waves, and these propagation properties are indicative of the internal structure of the cardboard structure.

Figure 2:
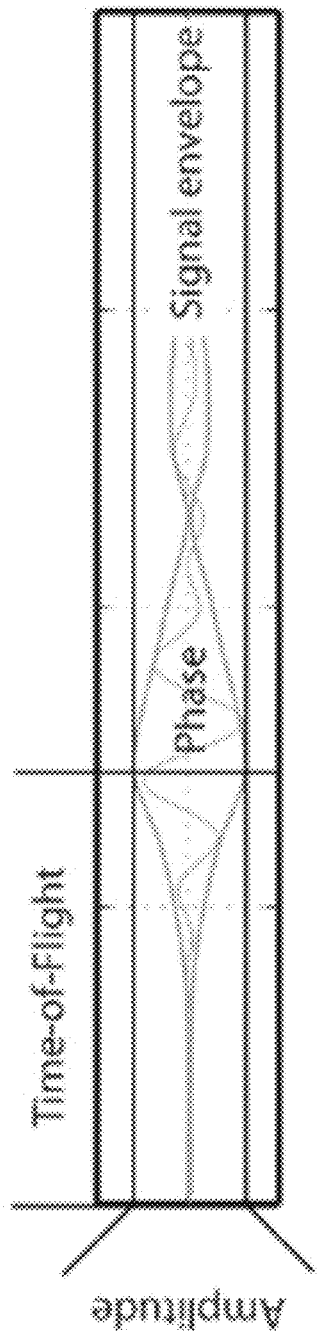
FIG. 2 is a schematic illustrating several signal propagation properties which can be analyzed to determine structural properties of a moving cardboard structure under inspection.

For example, the quantified propagation properties can include amplitude, time of flight and phase. As illustrated in FIG. 2, Amplitude (Amp) corresponds to the maximum of the measured signal's envelope, and can be affected by the Phase Velocity and mechanical damping in the moving cardboard structure. Time of flight (ToF) corresponds to the time it takes for the acoustic waves to arrive at the receiver probe 106 from the emitter probe 104, and can be calculated based on the signal envelope. ToF can be affected by the group velocity of the guided waves propagating in the tube. Instantaneous phase corresponds to a shift in the acoustic waves, and can be affected by the phase speed in the laminated cardboard structure. Other propagation characteristics can be used as well. For example, the (z-transform), transfer function (FT) or frequency response function (FRF) of the time-domain signal can be constructed, and the amplitude and phase can be extracted for a given frequency range.

Preferably, the system 100 is calibrated according to the laminated cardboard structure under inspection and according to the defects to identify. For example, control samples are provided, including undamaged laminated cardboard structures, with no defects, and also optionally laminated cardboard structures with known defects, and these control samples are inspected using the system 100 to measure and store these reference propagation properties, and their reference frequency responses. In this fashion, a correspondence between wave propagation properties and specific defects in the cardboard structure can be created. This correlation can be used to infer the presence of the defects in subsequently inspected cardboard structures, and determine the possible defect type. The calibration can be done using several different signal frequencies in order to identify the frequencies (or combination of frequencies) which allow for the most repeatability, least variability, and optimal sensitivity to the specific defects. It has been found through experiments that specific defects of moving cardboard structures are associated with corresponding frequency bands of the frequency response. The defects can thus be detected and identified by focusing the analysis on specific frequency bands.

Preferably, the cardboard structures under inspection are compared with control cardboard structures in the same batch (i.e. other tubes made during the same production run and/or in the same environment). Still preferably, the reference frequency responses representative of undamaged moving laminated cardboard structures are adjusted based on ambient temperature and humidity, to compensate for environmental changes of the airspace where the inspection method is conducted. As the ambient temperature and humidity changes, the frequency response of the control sample structures will also vary. Thus, the reference frequency responses must preferably reflect the current operational conditions under which the inspection method is conducted. It will also be noted that the reference frequency response is a function of the properties of the undamaged laminated cardboard structure used as the reference. These properties may include for example the number of plies, the wall thickness, the inner and outer diameter and the moisture content. As such, the reference frequency response differs based on the properties/mechanical characteristics of the cardboard structures used as a baseline or reference, and should be adapted according to the specifications of the cardboard structure under inspection.

Once calibrated, the system can be used to determine the presence of defects in objects, for example to verify that manufactured cardboard structures meet quality and structural standards. In the context of the manufacture of laminated cardboard tubes, the determination of the presence or lack of certain defects can allow for the prediction of the overall structural strength of the tube, such as its radial compression strength, and can thus allow knowing with relative certainty that the tube meets client specifications.

Figure 3:
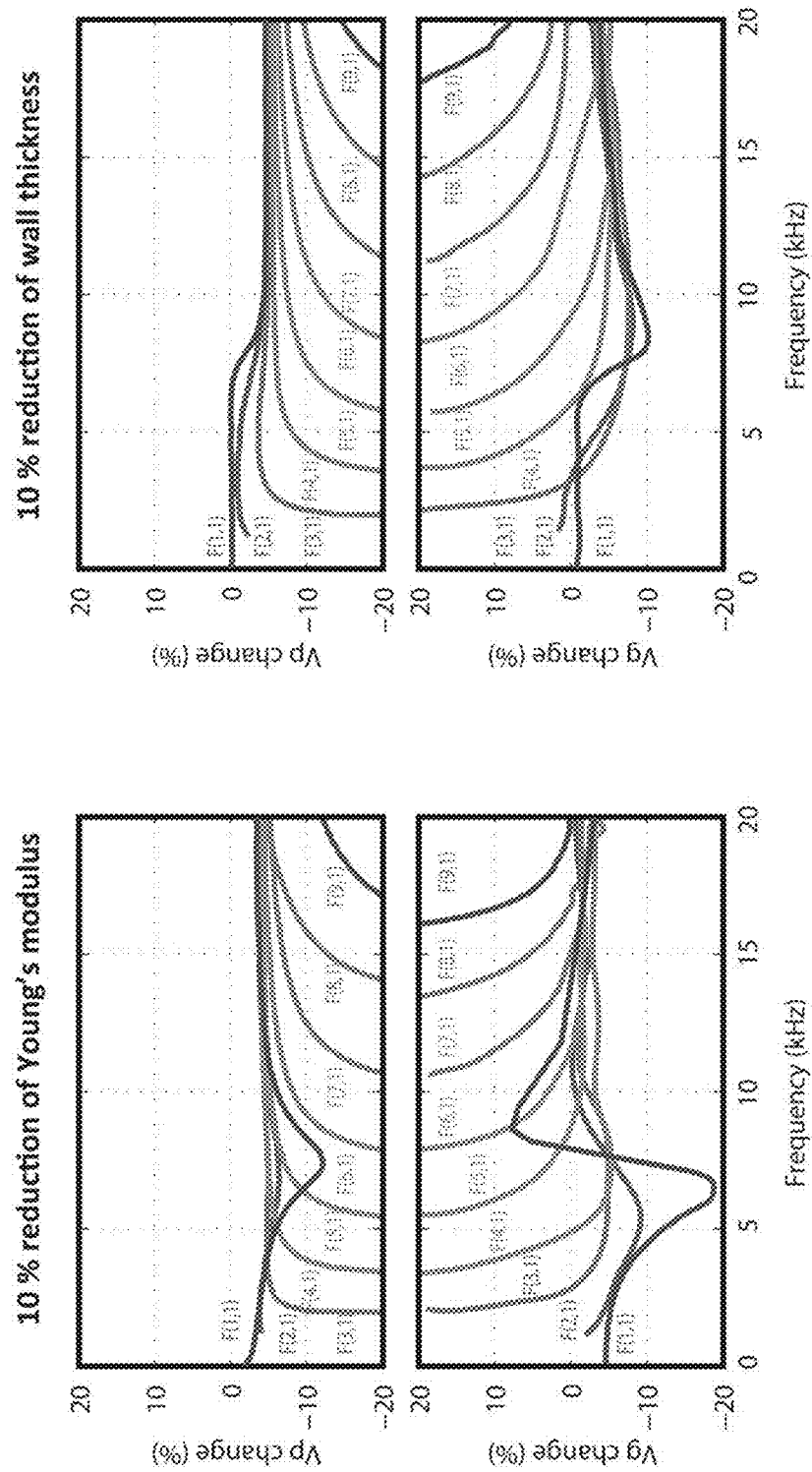
FIG. 3 is a graph illustrating the phase (top graph) and group (bottom) velocity changes (in %) for various flexural modes in the case of a 10% change of Young modulus (left) or thickness (right).

It has been found that the different types of defects in laminated cardboard structures can typically be associated with changes in the cardboard's elastic modulus or changes in the thickness of the wall. In other words, different types of defects in the cardboard structure can, in most cases, be associated with a reduction or increase of the elastic (Young) modulus and/or wall thickness of the structure. To determine the potential impact on wave propagation of flexural modes, the variations of the phase and group velocity with respect to a reduction of the thickness or flexural/elastic (Young) modulus is illustrated in FIG. 3. Only the flexural modes F(n,1) with n<9 are presented for clarity and the results are expressed in terms of relative changes with respect to undamaged cardboard structures. A reduction of 10% of the thickness corresponds to the case of a missing ply that may occur during the manufacturing process. The other damage scenario corresponds to a decrease of Young's modulus that may be due to excessive humidity or a reduction of laminate area. As can be noted from the graphs of FIG. 3, depending on the damage scenario and severity, changes of group velocity, and thus of ToF (time of flight) of the propagating wave packets are expected. In addition, a decrease of phase velocity can be responsible for a change of acoustic coupling, i.e. a change of refraction angle between acoustic and mechanical waves.

Figure 7A:
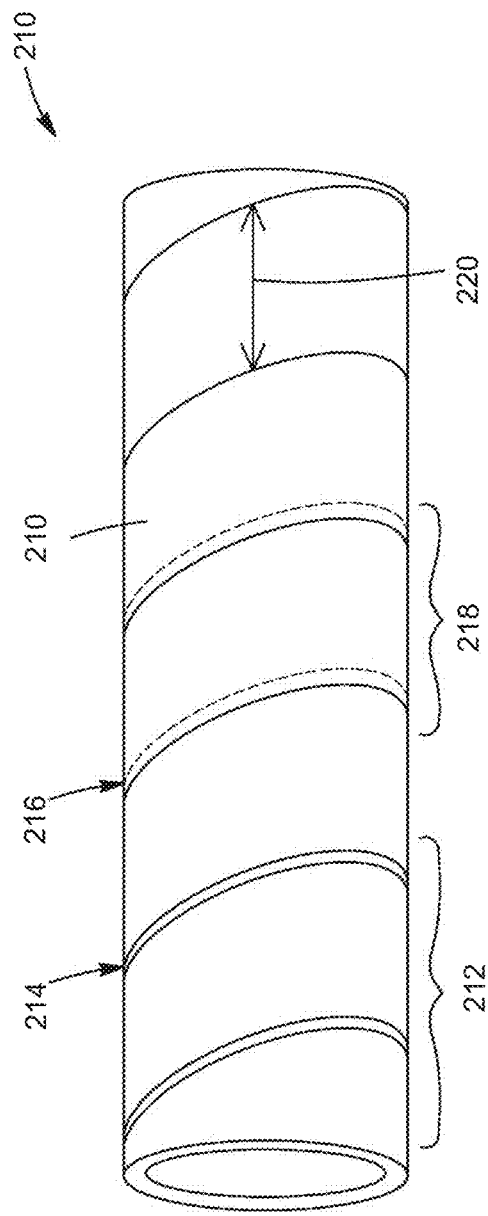
FIGS. 7A, 7B and 7C are schematics illustrating possible defects in laminated cardboard tubes which can affect the tube's strength.
Figure 7B:
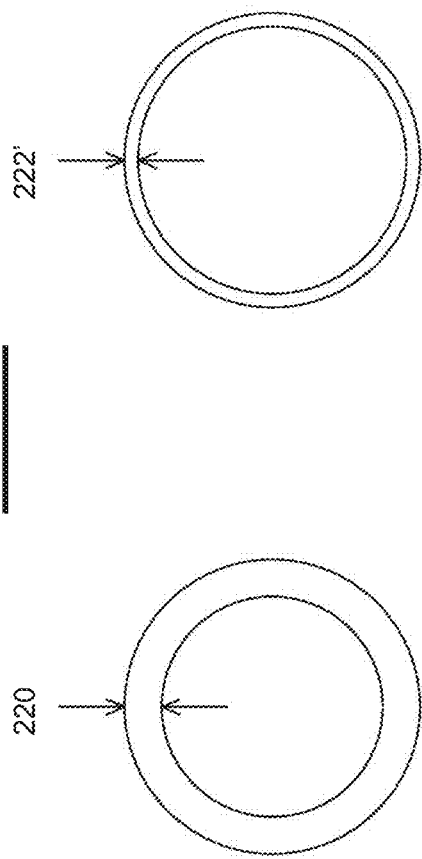
Figure 7C:

In the case of cardboard tubes, as illustrated in FIGS. 7A, 7B and 7C, there are several common defects which can affect their strength. Cardboard tubes 200 are generally formed by winding several layers and paper plies 210 and securing/bonding them with glue. During the winding process, the plies 210 can be spaced too far apart from one another, leaving a gap 214, or can overlap one another, leaving an overlapped section 218. Spaced-apart plies 212 and/or overlapped plies 216 can be referred to as "structural defects". Other types of defects include "bonding defects" or "gluing defects", where the lack of adhesives may result in a reduction of a properly laminated surface, which may also alter the performance (resistance to axial compression) of the final product. The width 220 of the plies 210 can also vary during production, and may deviate significantly (i.e. 1 mm or more) from a nominal band width. The cardboard tube 200 is formed of several overlapped plies 216, and these defects can occur in any one of the plies. Moreover, during production, the overall thickness 222 of the tube walls can vary, as shown in FIGS. 7B and 7C, due to the combined thickness of the plies 210, causing a thickness defect if the sidewalls are too thick or too thin. Although not illustrated, other defects can exist, such as an increased and/or decreased humidity of the tube, sections of the outermost ply being unlaminated, etc.

The inspection method and system described herein can be used with different types of cardboard structures. For example, the cardboard structures under inspection may comprise between 3 and 25 plies, each ply having a ply thickness between 8 and 40 points (1 point equals one thousandth of an inch, i.e. 0.001 inch). The wall thickness of the cardboard structures can be, for example, between 1 to 15 mm. The cardboard structure can be moved as speeds varying between 0.01 and 1.5 m/s. The internal moisture content of the cardboard structures may also greatly vary, for example from 4% to 14%. In the case of cardboard tubes, the inner diameter of the tubes can be between 25 to 160 mm and the outer diameter between 29 to 190 mm. The plies are typically bonded with a solvent-based adhesive. Of course, the intervals presented above are provided as indicators only, and the inspection method and system may be used for cardboard structures having different physical/geometrical characteristics.

As can be appreciated, given that is the system 100 allows for non-contact, non-destructive, and relatively quick inspection, in some embodiments, the inspection can be applied to all manufactured cardboard structures 200 during a production run, rather than exclusively to random samples taken off the production line. In this fashion, the quality of every tube manufactured can be known, rather than statistically inferring the quality of all manufactured tubes based on random samples. Moreover, in some embodiments, the inspection can be performed "in-line", in that the article need not be removed from the production line for inspection. As described above, the system 100 can include mechanisms for rotating the cardboard structures (such as tubes) and/or translating the structures such that it can be inspected while in constant motion moving down the production line.

The inspection method of the present invention can also optionally form part of a feedback loop, allowing for the production parameters to be adjusted if any defects are detected, in order to correct them in subsequently produced tubes. For example, the system can alert an operator if a significant defect has been detected and/or it may notify the operator of the specific defect identified such that the production equipment can be adjusted to correct the defect. In some embodiments, the system can generate a feedback signal responsive to detecting a defect. Still preferably, the feedback signal can be provided to production equipment to automatically adjust production parameters to correct for the detected defect. For example, bonding defects can be corrected by adjusting the amount of glue used, while ply width and ply thickness defects can be corrected by splicing in new plies.

Experimental Testing

Ultrasonic Non-Destructive Testing of Cardboard Tubes Using Air-Coupled Transducers During an experimental test using the disclosed method and system, to demonstrate the repeatability and robustness of both the method and system, five (5) batches of ten (10) cardboard tube samples were measured, with each batch representing one of the defect types, and one batch representing undamaged tubes. The relative values of radial compression strengths measured over ten different tubes are presented in the table below, to classify the influence on product quality with respect to the flaw type.

TABLE 1

Presentation of the typical flaws/defects and influence of the radial compression

| Defect Name | Description | Relative compression |
|---|---|---|
| U | Undamaged - reference measurements | 100% |
| J | Liner joint - presence of an adhesive joint in a liner | 97% |
| W | Liner width - reduction of 1 mm width for 5 liners | 95% |
| T | Wall thickness - decrease of 15% of thickness | 93% |
| H | Humidity - increase of moisture content | 47% |

The tubes used during the test were cardboard tubes having an 81 mm outer diameter and a 3.55 mm wall thickness. The structure of the tubes comprised an assembly of 10 plies of recycled paper liners of 130 mm width and 0.35 mm thickness, bonded together using a water-based adhesive. The plies were wrapped using a given orientation to increase core crush resistance.

Ten (10) undamaged tubes (control tubes, denoted "U") were manufactured to respect all the specifications described above. Additional tubes were manufactured to cover the different types of defects typically encountered during the manufacturing of laminated cardboard tubes. These included: tubes with the presence of an adhesive joint in a liner (denoted "J"); tubes having a reduction of 1 mm width for 5 liners (denoted "W"); tubes having a 15% decreased thickness of liners (denoted "T"); and tubes having an increase moisture content, i.e. humidity (denoted "H"). Standard compression tests were performed on the tubes to classify the influence on product quality. U tubes had a mean radial compression strength of 1.70 Mpa; J tubes 1.66 Mpa; W tubes 1.63 Mpa; T tubes 1.59 Mpa; and H tubes 0.82 Mpa.

Figure 4:
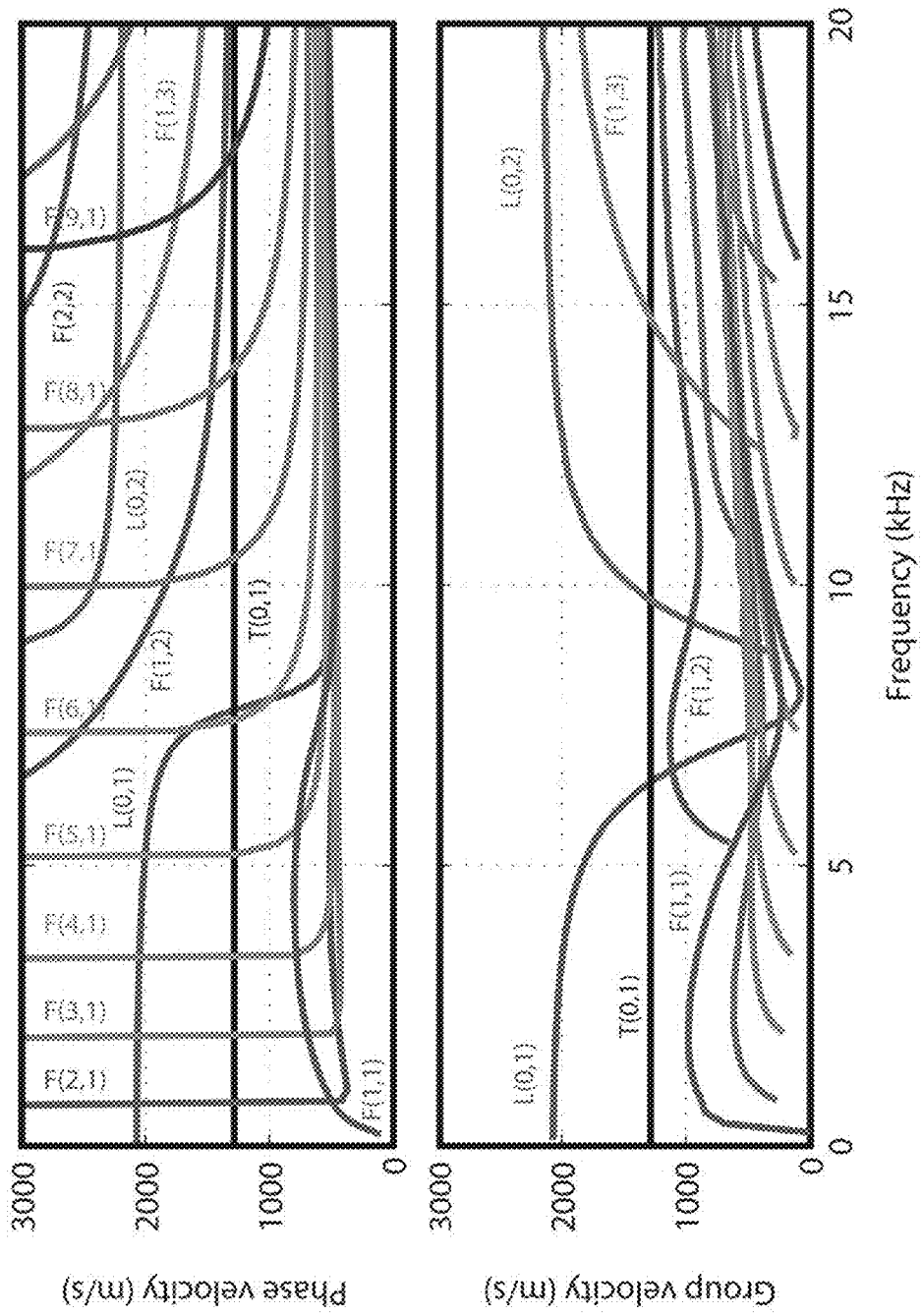
FIG. 4 illustrates dispersion curves of undamaged tubes, including measured phase (top) and group (bottom) velocities, as a function of frequency.

Given the structure of the cardboard tubes, many wave modes can be observed in the audible bandwidth, i.e. below 20 kHz. An exemplary dispersion curve is shown in FIG. 4, i.e. the phase and group velocity of the first modes as a function of frequency. In this example, the cardboard assembly is assumed isotropic with a mean density of 750 kg/m$^3$, a Young modulus of 3 GPa and a Poisson's ratio of 0.3. In FIG. 4, longitudinal modes are denoted by (L), torsional modes by (T) and flexural modes by (F).

The longitudinal mode L(0,1) and torsional mode T(0,1) corresponding to pure compression and torsion in the length and radial direction respectively, are presented but not used during the experimental test, due to the difficulty of using non-contact transducers in this frequency range. However, it is appreciated that these modes can be used for analysis in other embodiments.

In the experiment, flexural modes were preferred due to ease of generation and measurement using classical contact and non-contact transducers that are mostly sensitivity to out-of-plane motion. In the frequency range below 20 kHz, the first 9 flexural modes F(n,1), where n represents the number of cycles of variation around the circumference, have approximately the same phase velocity of 250 m/s above 2 kHz, such that mode selectivity is difficult to achieve, and multi-mode propagation occurs. It is appreciated, however, that in other embodiments analysis can be performed using specific modes if possible.

Figure 5:
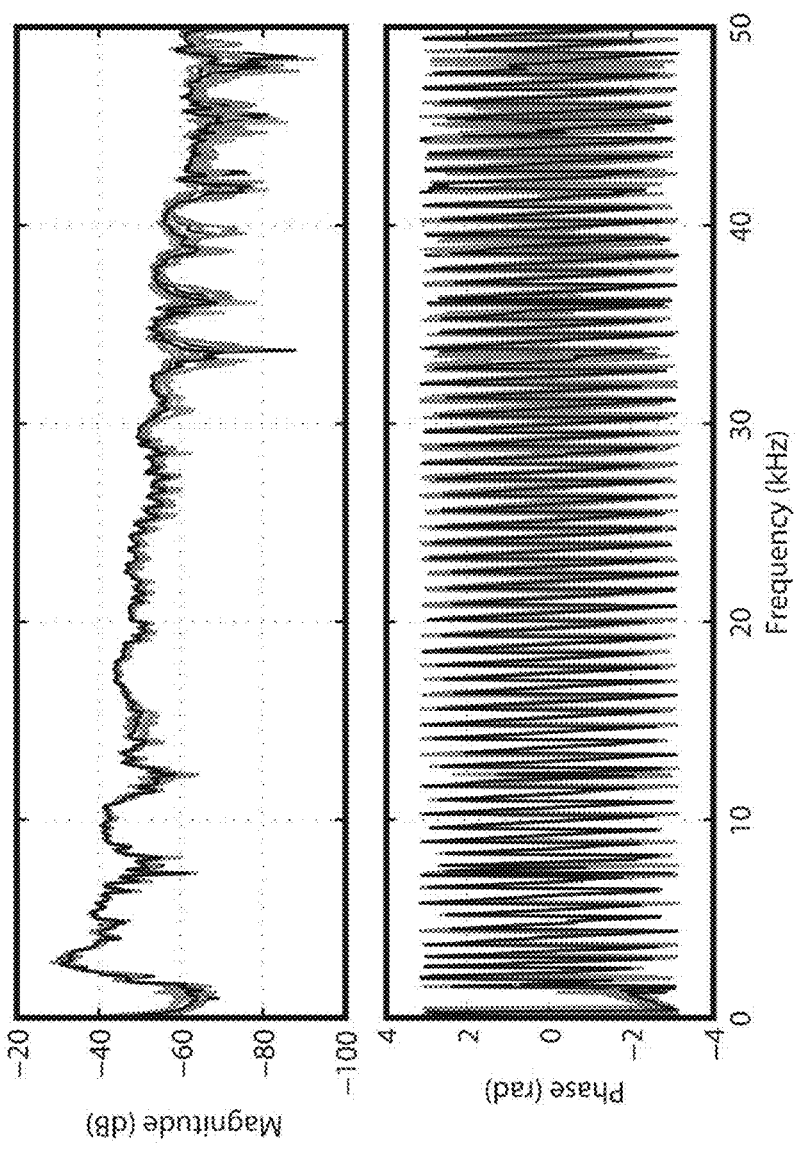
FIG. 5 illustrates transfer function magnitude (top) and phase (bottom) for ten (10) different undamaged tubes to illustrate in-group variability.

During the test, wave frequencies between 4 and 20 kHz were used, as waves in the audible range (20 kHz and less) demonstrated high repeatability among several samples in the same group for each of the propagation properties analyzed (Amp, ToF and Phase). As can be appreciated, it is preferred that frequencies with high repeatability and appropriate sensitivity be used. However, the ideal frequencies can vary according to the characteristics of the tube being inspected. Therefore, a preliminary analysis can be performed in order to select ideal frequencies for performing the test. For example, as illustrated in FIG. 5, the magnitude and phase of the transfer function of the several samples of undamaged tubes can be measured and plotted across a broad frequency range, such as between 0 and 50 kHz. The transfer function can be analyzed to determine frequency ranges which provide high repeatability, and which provide the greatest signal-to-noise ratio (SNR). In the present embodiment, frequency range of interest between 2 and 20 kHz was selected, but this can vary in other embodiments depending on the objects being analyzed.

In the experimental setup presented, in order to compare the different types of defects, the measurement of the frequency responses and the post-processing were done for each tube. During the test, the 5, 10 and 15 kHz frequency ranges were used, as these demonstrated the best repeatability and sensitivity for the defects under inspection. In each case, Hanning burst signals having about 3.5 cycles were used.

Figure 6:
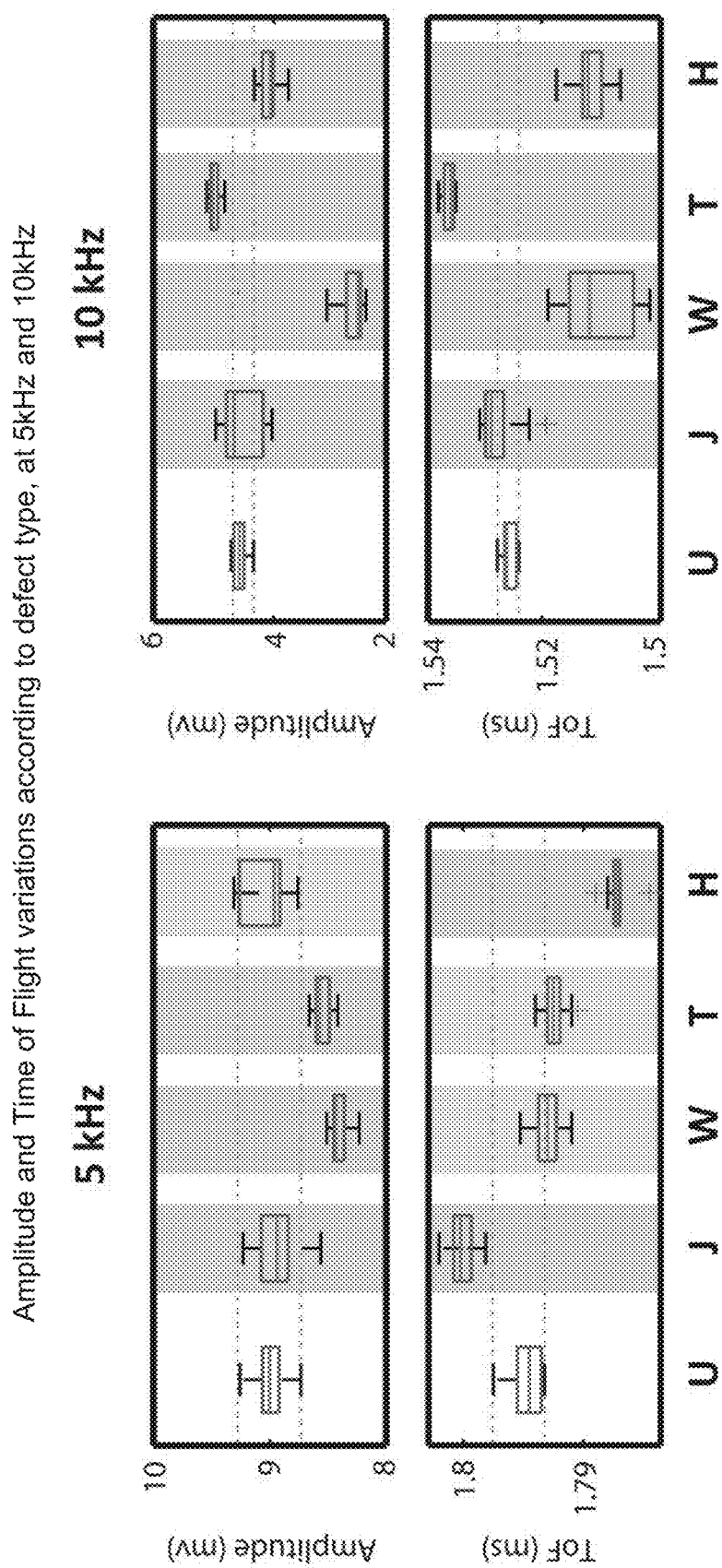
FIG. 6 illustrate the test results obtained using the test setup of FIG. 1 for test frequencies of 5 and 10 kHz.

The results of the test for each of the frequency ranges are shown in FIG. 6. This figure presents the results as a boxplot, in which the average, the standard deviation, and the extreme values are depicted. A chart is also indicated based on the metrics obtained for all the tubes in a batch with respect to the extremal values of the undamaged batch (U). For clarity, the results obtained for the five (5) batches at 5 and 10 kHz are presented for the Amp and ToF propagation properties. To identify defects in the moving laminated cardboard structure, the frequency response of the captured acoustic waves is measured and compared to a plurality of reference frequency responses representative of undamaged moving laminated cardboard structures. The reference frequency response can be based on an average of a predetermined number of previous measures of the captured acoustic waves. The standard deviation and/or average between the measured frequency responses and the reference frequency responses can be used to identify different types of defects, such as those described above. For example, a threshold on the standard deviation can be set for a predetermined frequency band—corresponding to a specific defect type, such that when the measured standard deviation exceeds the threshold, a defect is detected.

As shown in FIG. 6, all four (4) defect types can be accurately identified by comparing propagation parameters of inspected tubes to the propagation parameters of the undamaged group (U). In this example, the liner joint (J) can be detected by looking at the ToF at 5 kHz. In this specific example, the liner joint (J) causes an increase in ToF. The change of liner width (W) or humidity (H) can be identified by detecting a decrease in both amplitude and ToF at 10 kHz. The thickness decrease (T) can be identified by detecting an increase of amplitude and ToF at 10 kHz.

Thus, according to this exemplary test, with a measurement at two different frequencies, it is possible to discriminate between 4 flaw types. As can be appreciated, this relies on the proper definition of thresholds for undamaged tubes, such that a baseline measurement protocol can be required to calibrate the system. Since the air and guided wave propagation can be sensitive to ambient temperature and humidity, this baseline measurement can be required at periodic intervals in order to account for environmental changes. However, since the evaluation process can be automated, a sliding average process can also be acceptable. In some embodiments, the calibration can be performed using undamaged tubes only, and/or can be performed on tubes having known defects in order to determine the appropriate thresholds to detect the defects. In some embodiments, the calibration can involve automatically selecting appropriate signal propagation properties and/or signal frequencies to individually detect each defect optimally according to current environmental conditions.

Analyzing patterns in the results allows to define criteria for evaluating the integrity of different tubes in a lab setting. Absolute criteria can vary as a function of the spacing of the emitting and/or receiving probes, the angle between the probes, the distance between the probes and the tubes, and environmental conditions. However, it is appreciated that non-dimensional (i.e. relative) criteria (such as trends in various propagation parameters) can be used such that the inspection can be adapted to any type of experimental arrangement, and that the measurement and analysis can be properly calibrated according to the arrangement.

Figure 8:
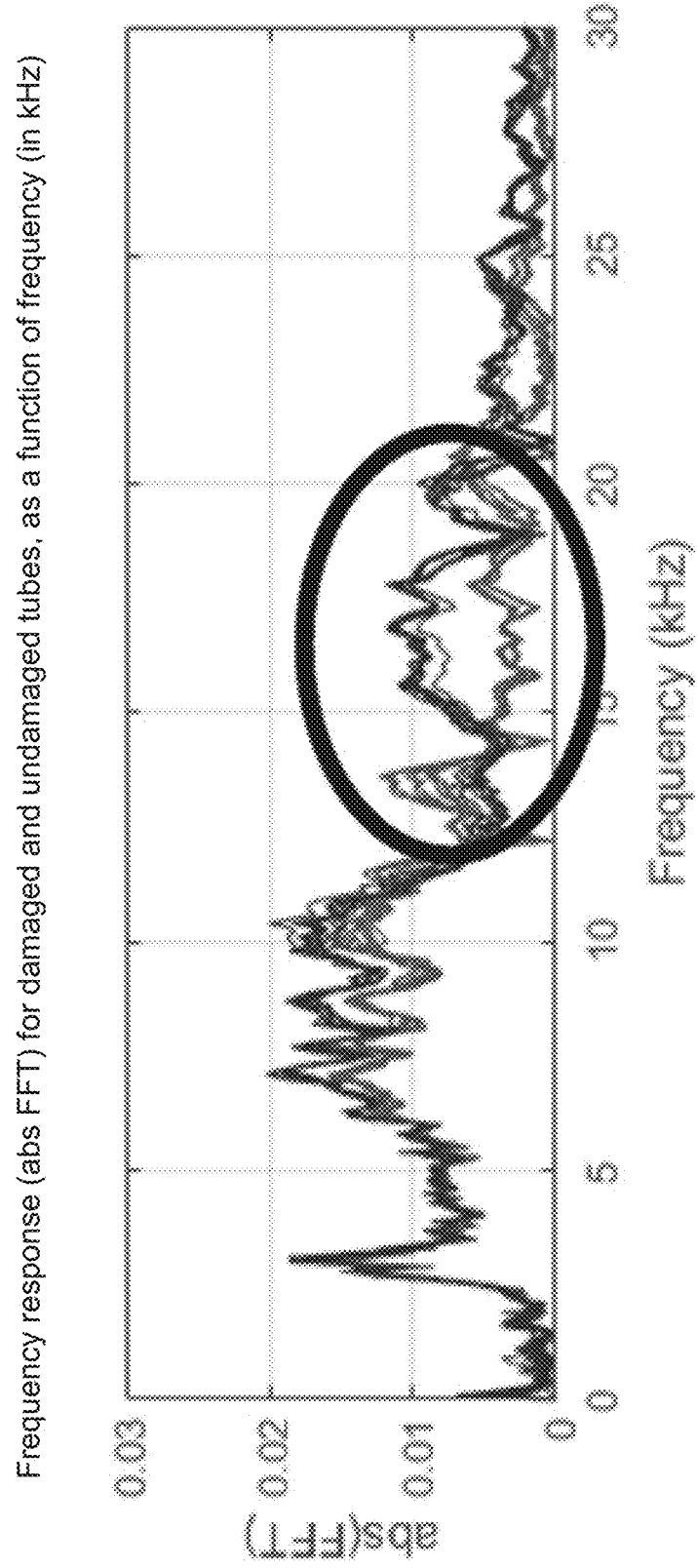
FIG. 8 is a graph illustrating the superposition of frequency response for several undamaged tubes and several tubes having severe defects.

It will also be appreciated that defects can be identified, for example, simply by performing amplitude measurements of the transfer function (also referred to as the frequency response). For example, as illustrated in FIG. 8, the frequency response of damaged tubes varies significantly from undamaged tubes in frequencies of about 15 to 18 kHz. Therefore, performing amplitude tests at these frequencies and identifying significant variations from undamaged control samples can indicate the presence of a specific defect. In such configurations, the structural properties of a tube can be determined by analyzing the first natural frequency of the tube, corresponding to the first spike in the frequency response function (FRF), and the spectral gap between the tube under inspection and undamaged tubes. Using undamaged tubes as a reference, it is possible to determine the average and variance of these two parameters.

In-Line, Non-Destructive Testing of Cardboard Tubes Using Piezo Transducers

In yet another experiment, in which moving cardboard tubes were inspected, the emitting and receiving probes 104, 106 were disposed in a casing/confinement space, allowing to increase the Signal to Noise Ratio (SNR) significantly. Furthermore, the emitter probe 104 was isolated from the receiver probe 106 with insulating material (foam panels). The emitting and receiving probes 104, 106 were placed at about 20 cm from the moving cardboard tube. In this experiment, the emitting probe 104 used was a piezo transducer (piezo buzzer), instead of a capacitive transducer. Just as for the previous experiment, the distances and angles between the emitting and receiving probes, and the cardboard structure to inspect, were adjusted so as to obtain the best conversion from acoustical wave to mechanical wave and thus reach the highest signal to noise ratio.

Figure 9:
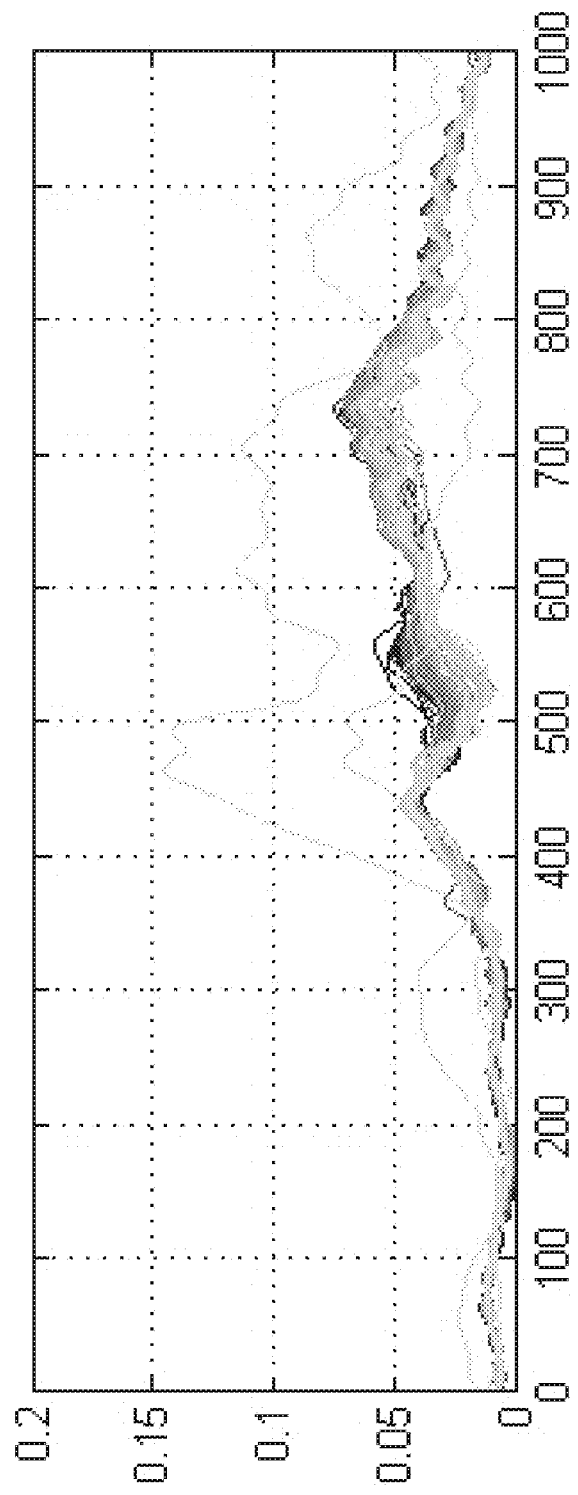
FIG. 9 is another graph illustrating the superposition of different frequency response as a function of frequency points between 35 kHz and 45 kHz for several undamaged tubes and tubes having severe defects.

A LabVIEW™ interface was used with a signal processor to generate the acoustic wave toward the cardboard structure, and the same interface was used to measure the captured acoustic waves resulting from the propagated mechanical waves in the cardboard structure. The data of the measured acoustic waves was streamed and saved. In order to establish a reference frequency response, 12 measures per second were taken (80 ms for each measure) and averaged. The frequency response was used between 35 kHz and 45 kHz, and a Chirp Z-transform was used to obtain a response over 1000 frequency points. At each 80 ms, the measured response was compared to the last hundred measures. Using such sliding average as a comparison base allows avoiding drifting phenomenon. The standard deviation is thus calculated between the slipping average and the measured frequency. A graph of the standard deviation as a function of the frequency response is illustrated at FIG. 9, were outliers can be clearly identified (lighter lines above 0.1 for example).

Figure 10:
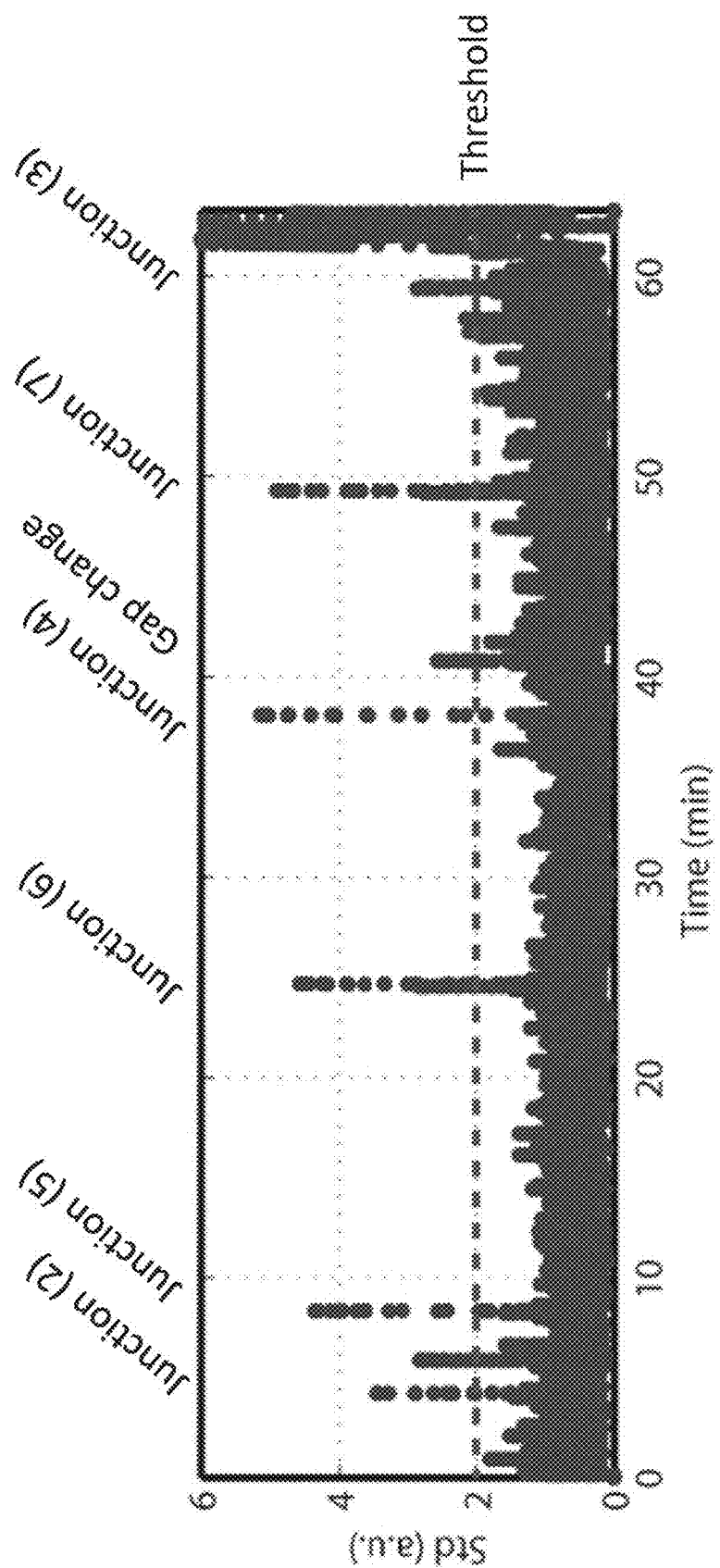
FIG. 10 is a graph illustrating the standard deviation (STD) between the measured frequency response of a moving cardboard tube and the reference frequency responses of undamaged cardboard tubes, as a function of time, wherein the frequency responses are not normalized.
Figure 11:
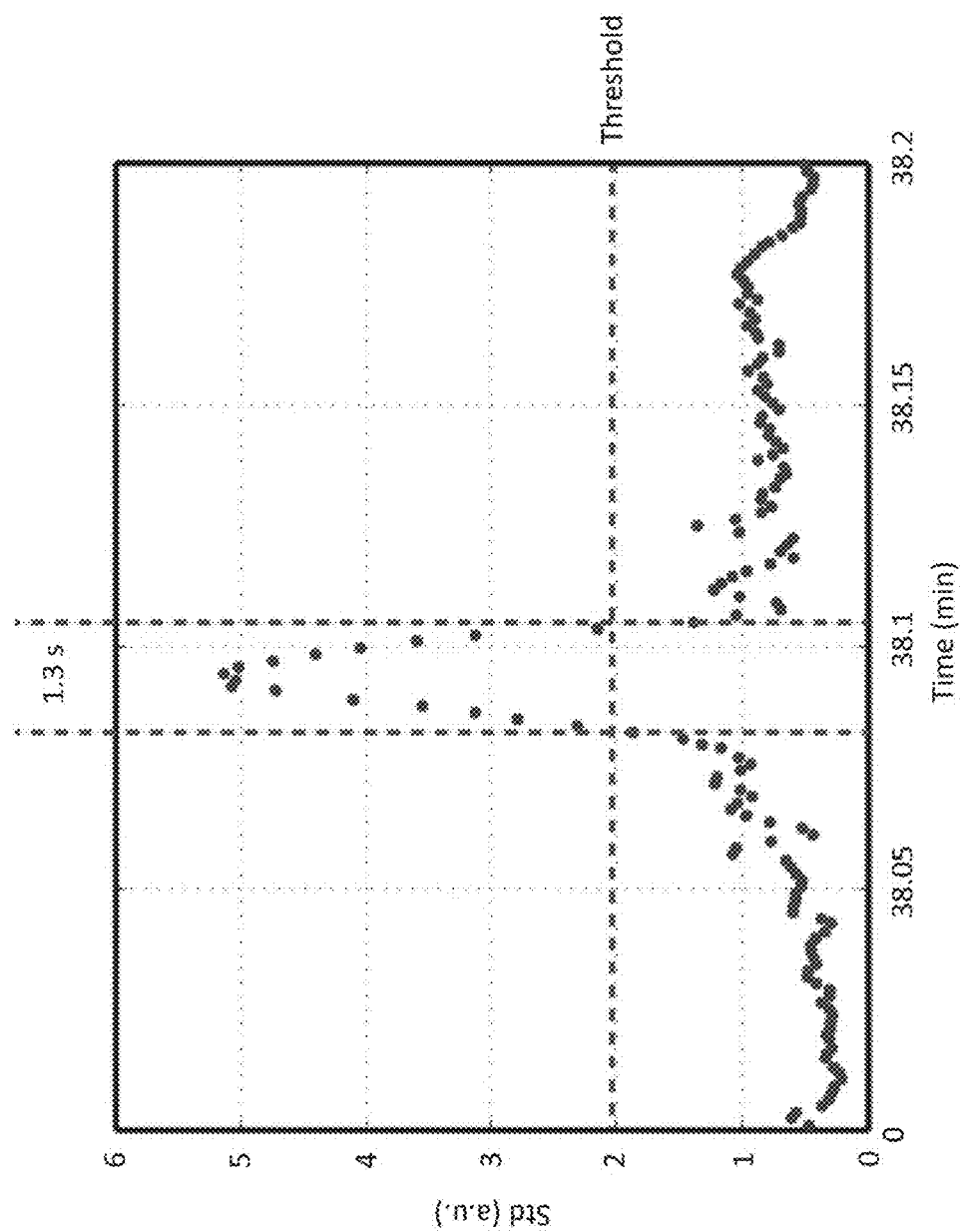
FIG. 11 is a closed up of the graph illustrated at FIG. 10, around a peak deviation at 38.5 sec, indicating a connection between two successive plies.
Figure 12:
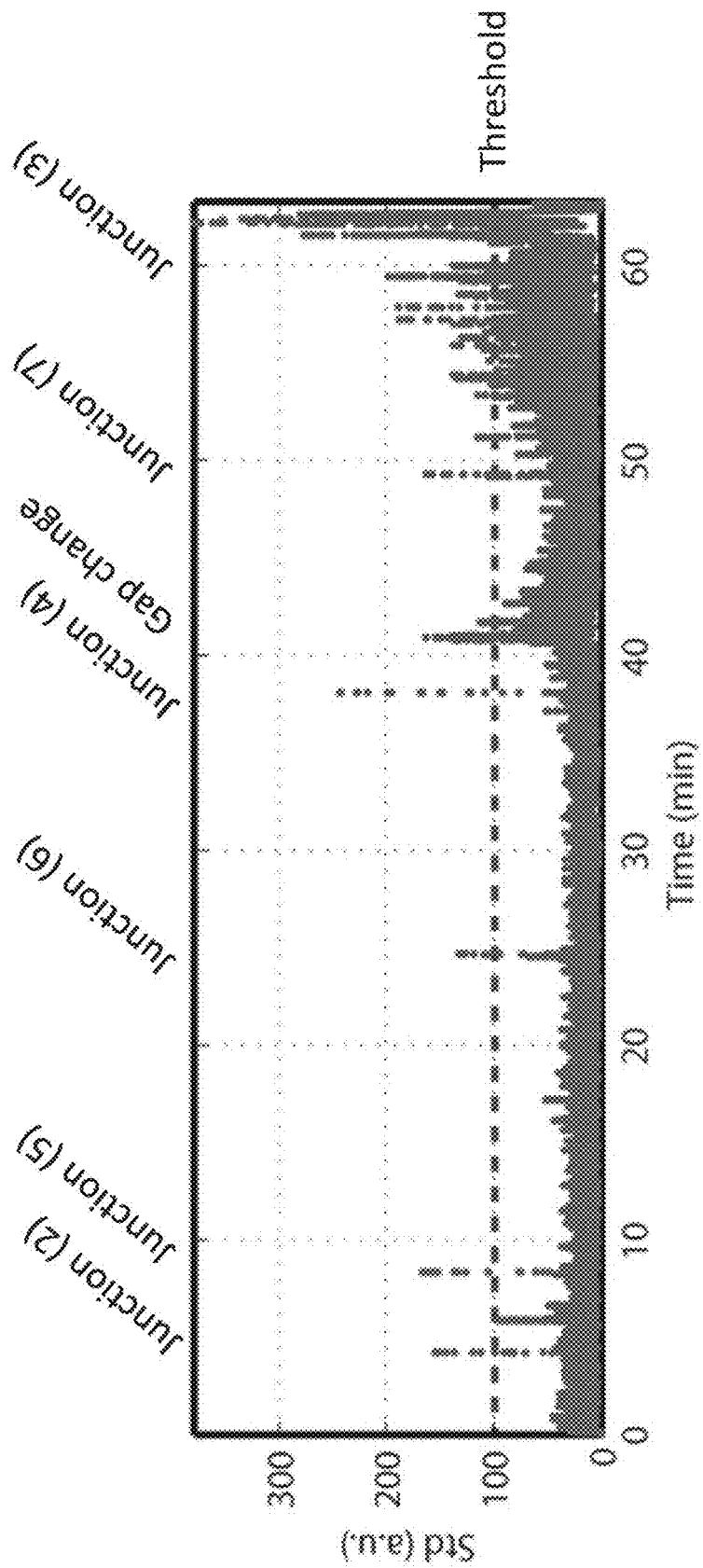
FIGS. 12 and 13 are graphs illustrating the standard deviation between the measured frequency response of a moving cardboard tube and the reference frequency responses of undamaged cardboard tubes, as a function of time, wherein the frequency responses are normalized.
Figure 13:
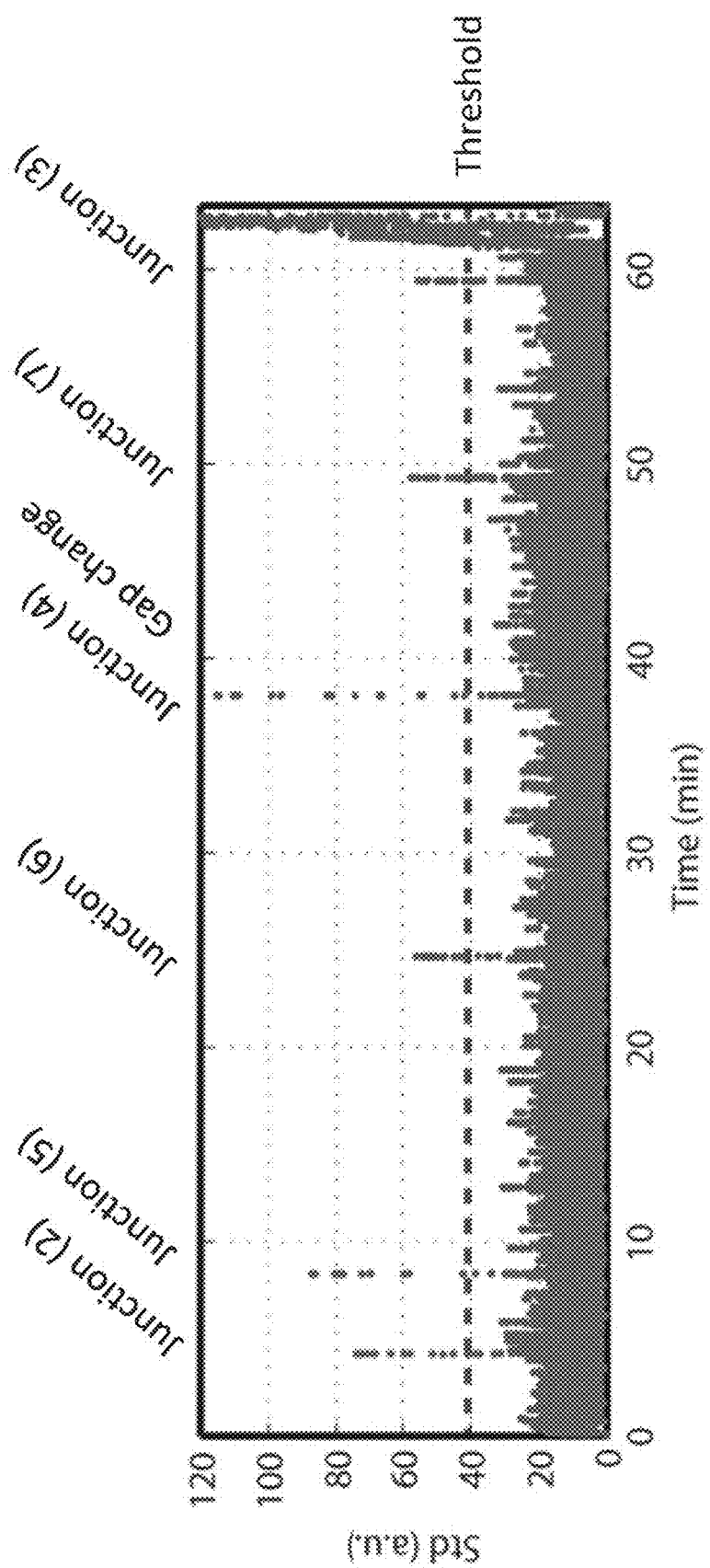

Given that different defect types occur at distinct frequencies, thresholds—such as on the standard deviation—can be set to detect and identify different defects. In other words, identifying defects in the moving laminated cardboard structure can be achieved by measuring the frequency response of the captured acoustic waves and by comparing said measured frequency response to a plurality of reference frequency responses representative of undamaged moving laminated cardboard structures. In this case, the reference frequency response is based on a slipping average of previous measured frequencies. By plotting the standard deviations (STD) as a measure of time, variations in the different physical parameters of the tubes can be identified, as shown in FIG. 10, at around 40 kHz. FIG. 11 shows an enlarged view of the graph of FIG. 9 around 38.1 min, in which a band junction can clearly be identified. FIGS. 12 and 13 show two other graphs of the evolution of standard deviation (STD) between the measured transfer function (TF) and the reference TF, by selecting the frequency range of interest between 39.5 and 41 kHz (FIG. 12) or 39.2 and 39.7 kHz (FIG. 13). Again here, band junctions and gaps can be clearly identified.

The described configurations are but some possible embodiments for the inspection method and system of the present invention. Although not explicitly mentioned, other useful embodiments or configurations may be apparent to one skilled in the art upon reading the present disclosure. Additionally, although some advantages have been described herein, other advantages may become apparent to one skilled in the art upon reading the present disclosure.

The invention claimed is:

1. An in-line, contactless and non-destructive method for detecting and identifying defects in a moving laminated cardboard tube made of layers of spirally wound paper plies, the method comprising the steps of:
    emitting acoustic waves with predetermined frequencies in an airspace toward the moving laminated cardboard tube at a first location, the acoustic waves being converted into mechanical waves propagating through the moving laminated cardboard tube along a length of the moving laminated cardboard tube and rotating around the moving laminated cardboard tube as they propagate;
    capturing acoustic waves the airspace at a second location, spaced away from the first location along the length of the laminated cardboard tube, wherein said captured acoustic waves result from a conversion of the mechanical waves propagating along the length of the moving laminated cardboard tube;
    measuring a frequency response of the captured acoustic waves; and
    detecting and identifying defects in the moving laminated cardboard tube by comparing the measured frequency response of the captured acoustic waves to at least one reference frequency response, a defect being identified when the measured frequency response of the captured acoustic wave is above a given frequency threshold.

2. The method according to claim 1, wherein the moving laminated cardboard tube has a lengthwise axis and is translated along said lengthwise axis.

3. The method according to claim 1, wherein the moving laminated cardboard tube has central axis and is rotated along said central axis.

4. The method according to claim 1, wherein the moving laminated cardboard tube comprises between 3 and 25 plies, and has a wall thickness between 2 and 15 mm.

5. The method according to claim 1, wherein the moving laminated cardboard tube has an inner diameter between 25 to 160 mm and an outer diameter between 29 and 190 mm.

6. The method according to claim 1, comprising a step of displacing the moving laminated cardboard tube with a speed of between 0.01 and 1.5 m/s.

7. The method according to claim 1, wherein the paper plies of the moving laminated cardboard tube are bonded with a solvent-based adhesive.

8. The method according to claim 1, wherein the moving laminated cardboard tube has an internal moisture content that can vary between 4 and 14%.

9. The method according to claim 1, wherein the at least one reference frequency response is representative of an undamaged moving laminated cardboard tube.

10. The method according to claim 9, wherein said step of comparing comprises calculating a standard deviation between the measured frequency response and a plurality of reference frequency responses.

11. The method according to claim 9, wherein the at least one reference frequency response is an average of a predetermined number of previous measures of the captured acoustic waves.

12. The method according to claim 9, wherein the at least one reference frequency response is a function of properties of the undamaged moving laminated cardboard tube used as a reference, said properties including a number of plies, a wall thickness, inner and outer diameter and a moisture content.

13. The method according to claim 9, comprising a step of adjusting the at least one reference frequency response based on ambient temperature and humidity, to compensate for environmental changes of the airspace where the method is conducted.

14. The method according to claim 1, wherein the defects comprise at least one of: presence of an adhesive joint in one of the paper plies, reduction of a width of one or more of the paper plies, a decrease in wall thickness and an increase in moisture content.

15. The method according to claim 1, wherein the defects identified are associated with changes of mechanical or geometrical properties of the moving laminated cardboard tube, such as a reduction of Young's modulus or a reduction of the wall thickness.

16. The method according to claim 1, wherein each of the defects is associated with corresponding frequency bands of the frequency response.

17. The method according to claim 1, wherein the mechanical waves generated through the moving laminated cardboard tube are guided waves.

18. The method according to claim 1, wherein the mechanical waves are flexural waves generated at a plurality of different frequencies, and the captured acoustic waves are measured at each of said plurality of different frequencies.

19. The method according to claim 1, wherein the propagation properties include time of flight, phase and/or amplitude.

20. The method according to claim 1, wherein the emitted acoustic waves are generated by a signal generator that can vary different characteristics, including said predetermined frequencies, as well as amplitude, phase and/or velocity.

21. The method according to claim 1, wherein the acoustic waves are generated at frequencies below 100 kHz.

22. The method according to claim 1, wherein the acoustic waves are generated at frequencies between 10-50 kHz.

23. The method according to claim 1, wherein the acoustic waves are generated at frequencies between 30-50 kHz.

24. The method according to claim 1, wherein the acoustic waves are generated at different frequencies in bursts.

25. The method according to claim 1, wherein the acoustic waves generated toward the moving laminated cardboard tube are directed at angle toward the moving laminated cardboard tube, and the acoustic waves are captured at substantially the same angle or at a different angle, according to the type of defects to detect.

26. The method according to claim 1, wherein the acoustic waves are captured with a transducer selected from one of: an air-coupled transducer, a loudspeaker, a capacitive transducer, a piezoceramic transducer and a microphone.

27. The method according to claim 1, comprising a step of generating feedback signals associated to the defects identified in the laminated cardboard tube, to indicate an occurrence of a defect.

28. The method according to claim 1, comprising a step of adjusting manufacturing parameters on the production line to correct for the identified defect in substantially real-time.

29. An in-line and contactless system for detecting and identifying defects in a moving laminated cardboard tube made of layers of spirally wound paper plies, the system comprising:
a signal generator coupled to an emitter probe, the emitter probe positioned at a first location, at a predetermined distance from the moving laminated cardboard tube, the emitter probe being operable to emit acoustic waves at predetermined frequencies toward the moving laminated cardboard tube; the acoustic waves being converted into mechanical waves propagating through the moving laminated cardboard tube along a length of the moving laminated cardboard tube and rotating around the moving laminated cardboard tube as they propagate;
a receiver probe positioned at a second position, at a predetermined distance from the moving laminated cardboard tube and spaced away from the first location along the length of the cardboard tube, the receiver probe being operable to capture acoustic waves resulting from a conversion of the mechanical waves propagating along the length of the moving laminated cardboard tube; and
a signal processing device operatively connected to the receiver probe, the signal processing device being configured to measure a frequency response of the captured acoustic waves captured by the receiver probe, and programmed to detect and identify defects in the moving laminated cardboard tube by comparing the measured frequency response of the captured acoustic waves to at least one reference frequency response, a defect being identified when the measured frequency response of the captured acoustic wave is above a given frequency threshold.

30. The system according to claim 29, wherein the emitter probe and the receiver probe are positioned at angles relative to a lengthwise axis of the moving laminated cardboard tube.

31. The system according to claim 29, wherein emitter and receiver probes are selected from one of: an air-coupled transducer, a loudspeaker, a capacitive transducer, a piezoceramic transducer and/or a microphone.

32. The system according to claim 29, wherein the signal generator and the emitter probe are operable to emit the acoustic waves with frequencies below 100 kHz.

33. The system according to claim 29, wherein the signal generator and the emitter probe are operable to emit acoustic waves between 30-50 kHz.

34. The system according to claim 29, comprising a support structure to support and adjust a position of the emitter probe and of the receiver probe, and comprises an acoustic insulator to isolate the emitter probe from the receiver probe.

35. The system according to claim 29, comprising a casing to isolate both the emitter probe and the receiver probe from environmental noises and perturbations.

36. The system according to claim 29, wherein the signal processing device comprises a processor and memory, the memory storing reference frequency responses representative of undamaged moving laminated cardboard tubes, the memory further storing instructions executable by the processor to compare said measured frequency response to the reference frequency responses representative of undamaged moving laminated cardboard tubes and identify said defects when the frequency response of the captured acoustic wave is above the given frequency threshold.

37. The system according to claim 36, wherein the memory has stored thereon different frequency band thresholds for different types of defects, said defects including at least one of: a presence of an adhesive joint in one of the paper plies, a reduction of a width of one or more of the paper plies, a decrease in wall thickness and an increase in moisture content.

* * * * *